Figure 5:
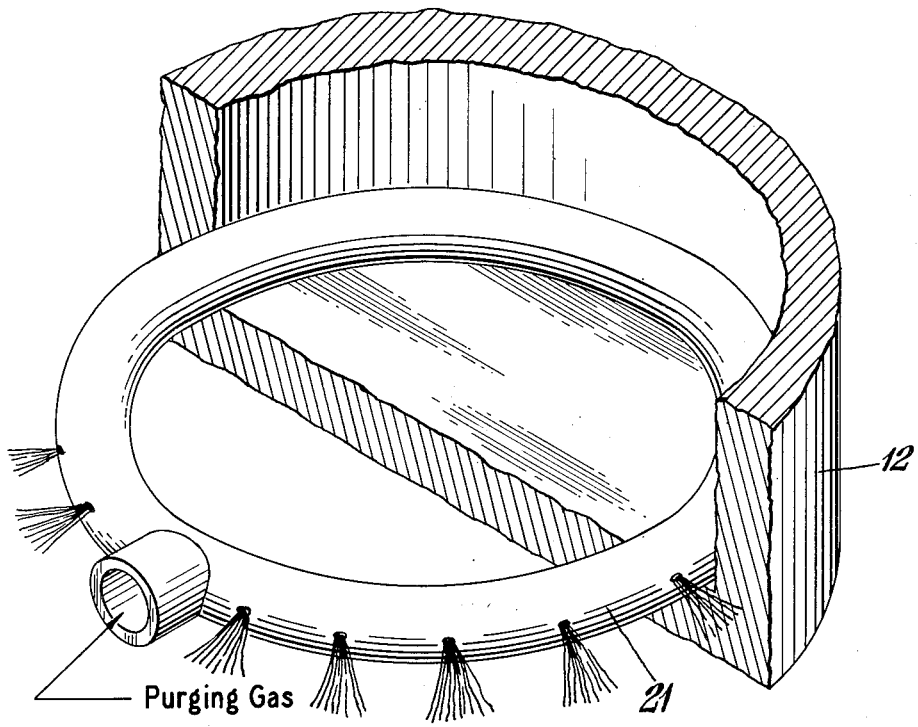

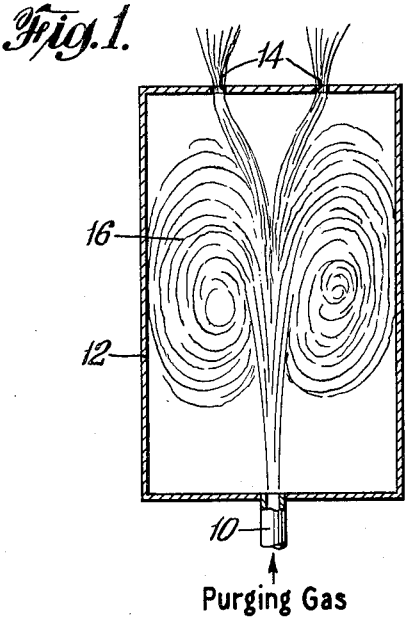
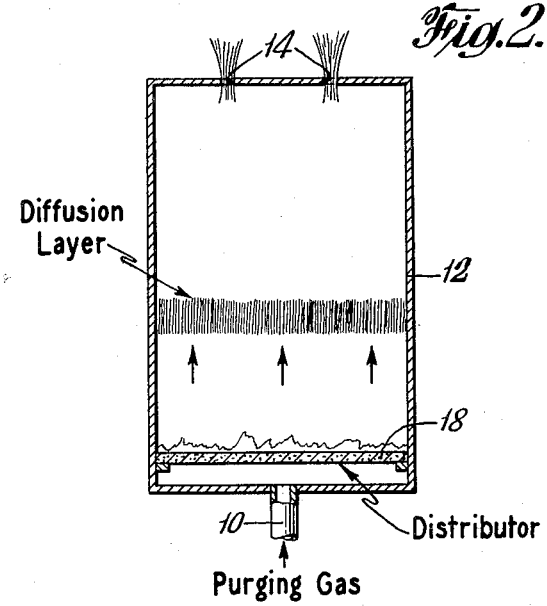
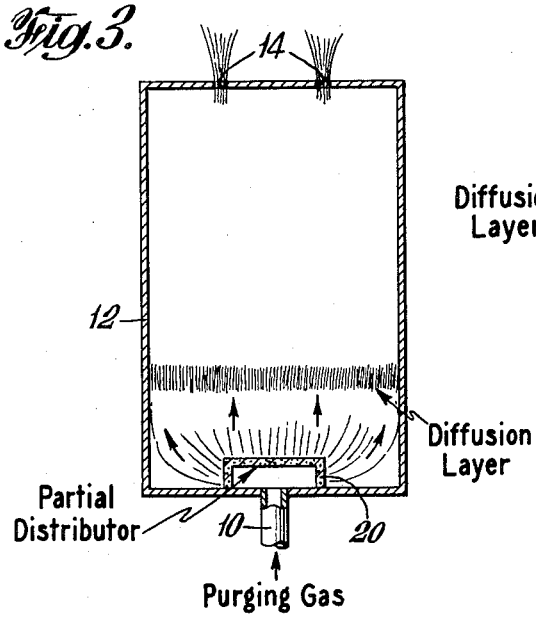
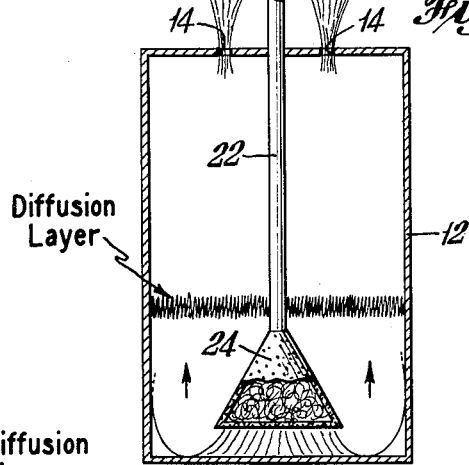

United States Patent Office 3,012,591
Patented Dec. 12, 1961

3,012,591
GAS PURGING METHOD AND APPARATUS
Peter A. McCormack, Nutley, Frederick R. Job, Jr., Cranford, and Maurice F. Hoffman, Whippany, N.J., assignors to Union Carbide Corporation, a corporation of New York
Filed Dec. 18, 1958, Ser. No. 781,414
14 Claims. (Cl. 141—4)

This invention relates to gas purging, i.e., the replacement of the gas in a chamber with another gas and is a continuation-in-part of our application Serial No. 708,257, filed Jan. 10, 1958, now abandoned.

The presence of gaseous contaminants including oxygen, nitrogen and atmospheric moisture, is undesirable in high-temperature operations on metals, such as titanium, zirconium, silicon, germanium, and the precipitation hardening alloys 17–7 pH stainless steel and Inconel X. These high-temperature operations include welding, furnace brazing, annealing, refining and crystal growing. The reactive metals titanium, zirconium and silicon readily combine with oxygen at elevated temperatures. Oxygen embrittles titanium and undesirably strengthens zirconium. In brazing operations, satisfactory bonding is inhibited by the presence of oxides formed from reaction with oxidizing contaminants. Precipitation hardening alloys usually contain aluminum and/or titanium which make the prevention of oxide formation a serious problem. In addition to welding and brazing, recent developments indicate advantages for atmospheric protection of liquid metal and the teeming stream during teeming operations on certain steel alloys.

The problem of protecting such metals from gaseous contamination becomes acute during brazing, heat treating and welding, and special equipment and techniques have been developed to ensure adequate atmospheric protection. In connection with welding among such techniques are large-diameter torch nozzles, trailing gas shields and weld backing bars through which an inert shielding gas is guided to protect all heated metal surfaces, both top and bottom. Adequate shielding of all weld surfaces becomes difficult to accomplish when the welded parts are of complex shape. In such an event, it becomes desirable to perform the welding operations inside of a chamber in which the entire atmosphere is a high-purity inert gas, such as argon or helium.

The problem of inadequate shielding is very acute in brazing and heat treating operations where the entire part is brought to an elevated temperature. Deoxidizing fluxes are often used to exclude contaminants; however, fluxing agents usually leave an undesirable residue which is often difficult or imposible to remove. Also, there is a considerable advantage to brazing in an atmosphere which does not require a flux.

A high purity inert atmosphere can be attained by first evacuating a chamber and then by backfilling with the desired inert gas. However, there are several disadvantages. Pumping equipment is necessary for the evacuation of the pressure-type chamber, and thus initial investment is high. In addition, the structural requirements for such a chamber lead to limitations of accessibility and visibility both to the workpiece and to the welding apparatus. In constructing the chamber, extreme care must be taken to prevent leakage of air into the chamber, leakage being greatest at low internal pressures.

Gas "purging," as used herein, is the replacement of one gas by another in an enclosed space or chamber at atmospheric or positive pressure. According to the present invention if the gas (such as argon) to be used is denser than air, for example, such gas is let into the chamber at the bottom, and the air is buoyed up to where it can be emitted through escape vents. Similarly, if the gas (such as helium) to be used is lighter than air, such gas is introduced at the top of the chamber causing the air to be displaced downwards.

In purging effected entirely by displacement, the gas or air originally present in the chamber is pushed out via escape vents as the gas to be used is let into the chamber. Displacement in which there is no mixing between such gas and the original content of the chamber is perfect (displacement) i.e., a one-to-one ratio. Although perfect displacement perhaps can never be realized in actual purging practice due to diffusion between purge gas and the original container atmosphere, it is possible according to this invention, to obtain results which much more nearly approach perfect displacement than was possible according to the prior art.

Prior to the present invention, gas purging took place by dilution or mixing. Because increasing amounts of gas to be used were passed through escape vents in mixture with the original gas contents as purging proceeded, an amount of such gas equalling many times the volume of the chamber was wastefully required to attain the desired purity of the desired atmosphere (as more fully described hereinafter). Such wasteful use of gas in effecting a desired atmosphere was heretofore a great deterrent to the use of purging chambers, being highly expensive in terms of operating cost.

Because pressures involved in gas purging are usually only slightly positive, i.e., a matter of inches of water (less than 0.10 p.s.i.), the structural requirements for the chamber are considerably less stringent than for the evacuated chamber, which must be designed to withstand atmospheric pressure. Purging chambers can be made lighter in weight and can be designed for maximum visibility and accessibility to the workpiece. Transparent plastic bags or boxes have been successfully used with rubber gloves located at points most convenient to the welding equipment and workpiece. Even with metal boxes, the viewports are much larger and more conveniently located than in the case with evacuated chambers. The cost of such equipment is quite low—such that several chambers can be made for different type operations with the total cost of the chambers being much less than any one evacuated type chamber.

The main object of this invention is to provide an improved method of and means for more efficiently and effectively (gas) purging chambers at slight positive pressure than has ever heretofore been accomplished. Another object is to obtain a desired purity of the selected gas with a minimum of waste.

According to the invention there is provided controlled, rapid purging of chambers using unexpectedly small quantities of the selected gas. The invention includes the novel features of:

(1) Use of a gas distributor such as a porous medium to control both the introduction and distribution of the gas into the chamber so as to approach theoretical displacement (one chamber volume purge), and such that a uniform purging gas front advances through the chamber;

(2) A minimum velocity for introduction of the purging gas in the chamber, said velocity being a function of the physical constants of both the purging gas and chamber atmosphere, the minimum velocity being greater than the diffusion rate between the atmosphere gas in the chamber and the purging gas.

In the drawing:
FIG. 1 is a flow diagram of the prior art method of gas purging;
FIG. 2 is a flow diagram of gas purging according to the invention;
FIG. 3 is a similar diagram of a modification of the invention, and
FIG. 4 is a similar view of another modification.

FIG. 5 is a similar view of yet another modification.

According to the prior art, as shown in FIG. 1, purging gas is fed to an inlet 10 in the bottom of a chamber 12 from which gas is discharged through top outlets 14. The purging gas mixes at 16 with the original chamber gas, as shown in FIG. 1 taken in conjunction with the following Table I, wherein the chamber being purged was a one cubic foot volume cylinder 10 inches in diameter and 22 inches in height.

TABLE I

*Argon purging of chamber with single inlet means*

| Test No. | 1 | 2 | 3 |
|---|---|---|---|
| Purge Gas Direction | Upward | Upward | Upward |
| Flow rate, c.f.h. | 3 | 15 | 30 |
| Reynold's No. (Re): | | | |
| Inlet Nozzle (Argon Zone) | 471 | 2,380 | 4,710 |
| Chamber [1] (Argon Zone) | 9 | 45 | 90 |
| Chamber [1] (Air Zone) | 8 | 40 | 80 |
| Ratio: Volume of Purge Gas Introduced/Chamber Vol.: | Percent Residual Oxygen [2] | | |
| .25 | 20.8 | 17.5 | |
| .50 | 28.4 | 13.5 | |
| .75 | 16.5 | 10.5 | 15.1 |
| 1.0 | 11.0 | 8.0 | 8.6 |
| 1.25 | 6.5 | 6.0 | |
| 1.50 | 3.5 | 4.5 | 5.7 |
| 1.75 | 2.0 | 3.5 | |
| 2.0 | .85 | 2.8 | 3.3 |
| 2.25 | .64 | 2.0 | |
| 2.50 | .50 | 1.7 | 1.9 |
| 2.75 | .36 | 1.3 | |
| 3.0 | .26 | 1.0 | 1.1 |
| 3.25 | .20 | 0.8 | |
| 3.50 | .14 | 0.6 | 0.7 |
| 3.75 | .10 | 0.5 | |
| 4.00 | .077 | 0.4 | 0.4 |
| 5.00 | .029 | 0.15 | 0.12 |
| 6.00 | .003 | 0.05 | 0.03 |
| 7.00 | .000 | 0.00 | 0.00 |

[1] Artificial Value—Gas is not actually distributed across the full section of the chamber.
[2] Measured at top of chamber.

Table I represents a summary of results obtained while purging with over a ten-fold range of flow rates employing a single inlet means, characteristic of prior procedures. In all cases a volume of gas equivalent to 7 times the volume of the chamber being purged was required in order to obtain a residual oxygen content of 0.00 percent in the case of air as the displaced gas. Within the accuracy of the test equipment and anticipated experimental error these results correlate very well with those predicted theoretically, assuming complete mixing of the gases according to the formula:

$$\frac{Ft}{V} = \log_e \frac{1}{1-c}$$

where:

$c$=volume fraction of inert gas
$F$=flow rate
$t$=time
$V$=volume of chamber

The Reynold's number (Re) of the flow in the examples is given both in the inlet nozzle and an artificial value for the flow in the chamber proper. The value of Reynold's number in the chamber is not a true one since the flow is not distributed across the section. While the Reynold's number hereinafter referred to shows no patentable limitation to the invention, it does serve as an indication of the velocity at which purging gas is introduced to the test chamber.

Reynold's number was calculated as follows:

$$Re = \frac{VD}{v}$$

where:

$V$=Average gas velocity in the chamber or inlet whichever is applicable, f.p.s.

$D$=Diameter of the chamber or inlet, ft.
$v$=Kinematic viscosity, ft.$^2$/sec.

$$V = \frac{\mu}{\rho}$$

$\mu$=Viscosity _____ lb. mass/sec. ft.
  Argon _____ .022×6.72×10$^{-4}$
  Helium _____ .0195×6.72×10$^{-4}$
$\rho$=Density _____ lb. mass/cu. ft.
  Argon _____ .1037 lb./cu. ft.
  Helium _____ .0103 lb./cu. ft.

Sample calculations:

(1) Conditions—
  Argon flow rate—15 c.f.h.
  Chamber diameter—10 in.

$$Re = \frac{Q}{A} \times \frac{D}{V}$$

$$= \frac{15}{3600} \times \frac{4}{\pi \left(\frac{10}{12}\right)\left(\frac{10}{12}\right)} \times \frac{\left(\frac{10}{12}\right) \times .1037}{.022 \times 6.72 \times 10^{-4}}$$

$$= 15 \times 2.98 = 15 \times \frac{29.8}{10}$$

$$= 45$$

(2) Conditions—
  Helium flow rate—15 c.f.h.
  Chamber diameter—10 in.

$$Re = \frac{15}{3600} \times \frac{4}{\pi \left(\frac{10}{12}\right)} \times \frac{.0103}{.0195 \times 6.72 \times 10^{-4}}$$

$$= 15 \times .336$$

$$= 5.04$$

Purging by the displacement method according to this invention is achieved by establishing a uniform front of the purging gas across the horizontal cross section of the chamber being purged, and maintaining the flow or movement of this front in a vertical direction at a velocity great enough so that mixing by inter-diffusion is at a minimum.

In practicing the method of the invention, the gas or air originally present in the chamber is passed out through vents at one vertical extremity of the chamber as the inert gas is introduced at the opposite end. A purge gas of higher density than the original chamber atmosphere must be introduced at the lowest point in the chamber and the escaping gases allowed to vent at the highest point in the chamber. Conversely, a purge gas of lesser density than the original atmosphere must be introduced at the top of the chamber with suitable escape vents provided in the base of the chamber. Thus, mixing by the effect of gravity is prevented and the difference in the gas densities utilized to aid in the formation of the uniform displacement front.

The most efficient displacement purging is achieved by introducing the purging gas to the chamber through a gas distributor having essentially the same horizontal area or diameter as that of the full cross section of the chamber being purged, such as the full plate distributor shown in FIG. 2. The most suitable distributor is a porous material such as sintered bronze powder. A reservoir or plenum chamber is provided between the inlet connection and the distributor so that the gas is evenly distributed across the upstream face of the porous member. The flow of gas thus issuing from the downstream face of the porous member is essentially unidirectional and of uniform velocity across the face of the member and thus across the chamber. There is thus formed a substantially uniform mass or displacement front of the purging gas across the chamber.

As further purging gas is introduced to the chamber, the uniform front will advance through the chamber, pushing the exiting chamber atmosphere before it. On the downstream side of the advancing front, the original atmosphere is virtually unchanged. At a slight distance upstream of the front, a purge gas atmosphere has been established. For a relatively short distance on either side of the invisible or theoretical front a diffusion layer exists. This diffusion zone or layer need not be of equal dimensions on both sides of the theoretical front. The activity and hence diffusion velocity of gases vary over a wide range. As a rule, the lighter gas molecules have high diffusion velocities.

The following Table II of diffusion coefficients for various pairs of gases illustrates this wide range of diffusion.

TABLE II

| Gas Pair | Diffusion Coefficient, Cm.² per second |
|---|---|
| Hydrogen—Argon | 0.770 |
| Argon—Nitrogen | 0.188 |
| Argon—Oxygen | 0.188 |
| Helium—Argon | 0.653 |
| Hydrogen—Oxygen | 0.689 |
| Hydrogen—Nitrogen | 0.657 |

As may be seen from Table II, argon has the advantage of a very low diffusion coefficient with oxygen and nitrogen compared to either of the light gases, hydrogen and helium. As a result, the diffusion zone is shorter between argon and air, for example, than a light gas and air such that purging with argon will be more efficient than either hydrogen or helium. That is, fewer volumes of argon purge gas will be required to purge the chamber.

As shown in FIG. 2, a full plate distributor 18 of porous metal (sintered bronze powder), having the same area and diameter as the cross section of the chamber, is mounted near the bottom of the chamber 12, over the purging gas inlet 10. Results of the use of FIG. 2 according to the invention, using argon as the purging gas and air as the chamber atmosphere being purged, are indicated in the following Table III.

TABLE III

| Test No. | 1 | 2 | 3 | 4 | 5 | 6 | 7 | 8 |
|---|---|---|---|---|---|---|---|---|
| Purge Gas Direction | Up | Up | Up | Up | Up | Up | Up | Up |
| Flow Rate, c.f.h. | 1.667 | 3 | 16 | 33 | 66 | 99 | 165 | 297 |
| Re Argon Zone | 5 | 9 | 50 | 100 | 200 | 300 | 500 | 900 |
| Ratio: Purge gas volume/chamber volume: | Percent Residual Oxygen [1] | | | | | | | |
| .25 | 20.8 | 20.8 | | | | | | |
| .50 | 18.3 | 18.5 | | | | | | |
| .75 | | 10.0 | | | | | | |
| 1.0 | 11.0 | 3.0 | | | | .75 | .17 | .15 |
| 1.25 | | .65 | .32 | .25 | .00 | .00 | .00 | .00 |
| 1.5 | 3.5 | .15 | .00 | .00 | | | | |
| 1.75 | | .03 | | | | | | |
| 2.0 | 1.2 | .00 | | | | | | |
| 2.5 | 0.2 | | | | | | | |
| 3.0 | .11 | | | | | | | |
| 3.5 | .05 | | | | | | | |
| 4.0 | .01 | | | | | | | |
| 4.5 | .00 | | | | | | | |

| Test No. | 9 | 10 | 11 | 12 | 13 | 14 | 15 | 16 |
|---|---|---|---|---|---|---|---|---|
| Purge Gas Direction | Up | Up | Up | Up | Up | Up | Up | Down |
| Flow Rate, c.f.h. | 396 | 495 | 595 | 660 | 825 | 990 | 1,155 | 15 |
| Re Argon Zone | 1,200 | 1,500 | 1,800 | 2,000 | 2,500 | 3,000 | 3,500 | 45 |
| Ratio: Purge gas volume/chamber volume: | Percent Residual Oxygen [1] | | | | | | | |
| .25 | | | | | | | | |
| .50 | | | | | | | | |
| .75 | | | | | | | | |
| 1.0 | .11 | .12 | .15 | .2 | .3 | .3 | .3 | 8.4 |
| 1.25 | .00 | .00 | .03 | | | | | 6.5 |
| 1.5 | | | .00 | .02 | .02 | .02 | .02 | 5.0 |
| 1.75 | | | | .00 | .00 | .00 | .00 | 3.8 |
| 2.0 | | | | | | | | 2.9 |
| 2.5 | | | | | | | | 1.7 |
| 3.0 | | | | | | | | 1.0 |
| 3.5 | | | | | | | | .6 |
| 4.0 | | | | | | | | .4 |
| 4.5 | | | | | | | | .2 |
| 5.0 | | | | | | | | .02 |
| 6.0 | | | | | | | | .00 |

[1] Measured at the top of the chamber.

Table III represents a summary of results obtained while purging a one cubic foot cylindrical chamber having a diameter of 10 inches and a height of 22 inches with over a thousand-fold range of flow rates and a resulting chamber gas flow velocity, as represented by Reynold's numbers, ranging from 5 to 3500. Since the distributor covers the entire horizontal cross section of the chamber, the Reynold's number given accurately represents flow conditions in such chamber. These results show that the most efficient purging, represented by the ratio of purge gas volumes to chamber volumes required to attain a residual oxygen content of 0.00 percent, is obtained with a gas flow velocity of argon in the chamber having a minimum Reynold's number greater than 9. Below this, the velocity of the advancing displacement front is not sufficiently greater than the diffusion rate between the chamber atmosphere gas and the purging gas to prevent deleterious back-diffusion of the gases.

However, for argon gas flow velocities in the chamber having Reynold's numbers of 50 or more, the efficiency of purging is essentially no longer effected by the purging gas velocity in the chamber. For instance, between Reynold's numbers of 200 and 1500, the ratio of purge gas volumes-chamber volumes required to reach a residual oxygen content of 0.00 percent remains constant at 1.25. Similarly, between Reynold's numbers of 2000 and 3500, the ratio remains constant at 1.75.

Test 16 of Table III is included merely to illustrate the effect of introducing the purging gas in a direction opposing the rule of heavier gas at the bottom and lighter gas at the top. Introducing the gas in the direction opposite to that indicated by the comparative densities of the purge gas and chamber atmosphere results in increased diffusion and purging which approximates mixing such as that of Table I.

Thus, when a distributor of the type shown in FIG. 2, is employed, the establishment of the required uniform displacement front and the resulting degree of efficiency of purging depends upon:

(1) Providing a plenum chamber such that the purge gas is essentially equally apportioned across the entire up-stream face of the porous distributor.

(2) Maintaining a minimum velocity of the purging gas flow in the chamber which is greater than the diffusion rate between the chamber atmosphere and the purging gas.

(3) Introducing the purging gas at the proper location, that is, at the bottom when a heavier gas is used as the purging medium, and at the top when a lighter gas is used.

The ratio of purge gas volumes to chamber volumes required to completely purge a chamber will vary, of course, primarily with the purging gas used and possibly, but to a much lesser extent, with the shape of the chamber being purged. Some chambers by their very design characteristics are more easily purged than others. However, since the chamber used in deriving the results of Table I and Table III were identical, it can be assumed that these results represent the relative efficiencies of displacement and mixing purging for most normally used chamber designs.

When construction features or operational requirements of a chamber will not permit the use of a full plate distributor such as the distributor 18 of FIG. 2, a partial or less than full plate distributor may be used. Two examples of such partial distributors are the porous inverted cup-type distributor of FIG. 3 and the cone-type distributor of FIG. 4. The purging efficiency obtained with a partial distributor will not be equal to that obtained with a full plate distributor. However, provided the following basic requirement for partial distributor design is adhered to, there is a wide range of chamber diameter to distributor diameter that will still produce efficient displacement purging with a partial distributor. The basic requirement for obtaining efficient displacement purging with less than a full plate distributor is that the gas must be introduced into the chamber from the distributor in a lateral direction. This is due to the fact that before the required uniform displacement front can be obtained, it is necessary that the original chamber atmosphere be scavenged from along the bottom (or top, depending on the density of the purging gas used) of the chamber being purged. The decrease in efficiency is due to the fact that this required two directional flows in the early stages of the purge results in mixing of the purge gas with the original chamber gas at the bottom of the chamber while the bottom is being scavenged and the displacement front is being formed. As a result of mixing and diffusion, there is a thicker mixed gas layer between the purge gas and the displaced gas, and hence, a slightly larger ratio of purge gas volumes to chamber volume required to completely purge the chamber.

As shown in FIG. 3, a partial cup-type distributor 20 of porous metal is mounted at the bottom of the chamber 12 over the purging gas inlet 10. Results of the use of FIG. 3 according to the invention, using argon as the purging gas and air as the displaced gas, are indicated in the following Table IV.

TABLE IV

| Test No. | 1 | 2 | 3 | 4 | 5 | 6 |
|---|---|---|---|---|---|---|
| Purge Gas Direction | Up | Up | Up | Up | Up | Up |
| Flow Rate, c.f.h. | 33 | 66 | 99 | 165 | 231 | 297 |
| Diffuser exit velocity, f.p.s. | .24 | .48 | .72 | 1.2 | 1.68 | 2.16 |
| Re Argon Zone | 100 | 200 | 300 | 500 | 700 | 900 |

| | Percent Residual Oxygen [1] | | | | | |
|---|---|---|---|---|---|---|
| Ratio: Purge Gas volume/chamber volume: | | | | | | |
| 1.0 | | | | | | |
| 1.25 | .25 | .04 | .06 | | | |
| 1.5 | .00 | .00 | .00 | | | |
| 1.75 | | | | .02 | .06 | |
| 2.0 | | | | .00 | .00 | .02 |
| 2.25 | | | | | | .00 |
| 3.0 | | | | | | |
| 3.25 | | | | | | |

| Test No. | 7 | 8 | 9 | 10 | 11 | 12 |
|---|---|---|---|---|---|---|
| Purge Gas Direction | Up | Up | Up | Up | Up | Up |
| Flow Rate, c.f.h. | 396 | 495 | 595 | 660 | 825 | 1,155 |
| Diffuser exit velocity, f.p.s. | 2.88 | 3.60 | 4.33 | 4.80 | 6.00 | 8.40 |
| Re Argon Zone | 1,200 | 1,500 | 1,800 | 2,000 | 2,500 | 3,500 |

| | Percent Residual Oxygen [1] | | | | | |
|---|---|---|---|---|---|---|
| Ratio: Purge Gas volume/chamber volume: | | | | | | |
| 1.0 | | | | | | |
| 1.25 | | | | | | |
| 1.5 | | | | | | |
| 1.75 | | | | | | |
| 2.0 | | | | | | |
| 2.25 | .01 | .02 | | | | |
| 2.50 | .00 | .00 | .02 | | | |
| 2.75 | | | .00 | | | |
| 3.0 | | | | .01 | .01 | .01 |
| 3.25 | | | | .00 | .00 | .00 |

[1] Measured at the top of the chamber.

Table IV represents a summary of results obtained while purging a one cubic foot cylindrical chamber having a diameter of 10 inches and a height of 22 inches using a partial distributor of the inverted cup-type having a height of 1½ inches and a diameter of 1.1 inches. The range of Reynold's numbers for the velocity of the purging gas in the chamber varies from 100 to 3500. The ratio of purge gas volumes to chamber volumes required to reach a residual oxygen content of 0.00 percent with a Reynold's number of 3500 is only 3.25 as compared to a minimum of 7.0 volumes required for dilution or mixing purging. This clearly illustrates that the velocity of the purge gas flow in the chamber is not the determining factor. However, when a less than full plate distributor is used, another factor enters into determining the efficiency of the purging. This factor is the flow velocity of the gas as it exits from the distributor. As seen from Table IV, this exit velocity was varied from .24 to 8.40 feet per second. The most efficient purge was achieved when this exit velocity was below 1.0 foot per second. Above this exit velocity, there tends to be more mixing of the gas as it exits in the lateral direction with the atmosphere in the bottom of the chamber and, hence, a thicker mixed gas layer at the displacement front.

One technique which may be employed to minimize the effect of high exit gas velocity from the distributor on the thickness of the mixed gas layer, while achieving the benefits of high gas flow rates (less diffusion and less purge time) is a two-stage purge cycle. Such technique entails a low exit velocity (less than 1.0 foot per second) from the distributor until the uniform velocity displacement front is established, after which the flow rate may be increased since it no longer effects the purging efficiency, as previously illustrated with the full plate distributor.

Thus, when a partial distributor is employed, the efficiency of the displacement purging will depend not only on: (1) maintaining a minimum velocity of the purging gas flow in the chamber which is greater than the diffusion rate between the chamber atmosphere and the purging gas; (2) introducing the purge gas into the chamber from the distributor in a lateral direction; (3) introducing the purging gas at the proper location (top or bottom) dictated by the relative densities of the purge and the chamber atmosphere; but also on (4) maintaining the exit velocity of the purge gas from the distributor such that a minimum of mixing of the purge gas as it exits in the lateral direction with the atmosphere in the bottom of the chamber will occur; and (5) the configuration of the distributor should be such that the mixing of the purge gas with the original chamber atmosphere is confined to as narrow a zone as possible at the bottom of the chamber. This last is achieved by keeping the height of the distributor as short as possible commensurate with the gas flow requirement. For the most efficient purging, this range for the distributor exit velocity, as indicated in Table IV, is 1.0 foot per second or below. However, as the results of test No. 12 of Table IV indicate, even at an exit velocity of 8.4 feet per second, only 3.25 volumes of purge gas were required to reach a residual oxygen content of 0.00 percent.

In addition to the inverted cup-type distributor shown in FIG. 3 and the cone-type distributor containing a porous packing, such as steel wire shown in FIG. 4, perforated metal plates or discs, porous cylinders, and perforated tubular rings shown in FIG. 5 located around the periphery of the chamber to be purged have been successfully employed to achieve displacement purging. In the case of the perforated tubular rings, which are particularly applicable for purging reheating furnaces and retorts for furnace brazing, the orientation of the perforations in the ring should be such that the purge gas, such as argon, is directed into a corner or junction of the side and base of the chamber 20 so that the jets of gas intersect the walls just above the junction of the base and wall. Thus, the gas is deflected along the base of the chamber to scavenge the bottom, and as more purge is introduced, the displacement front is formed and rises vertically in the chamber.

While the examples given have been limited to the upward displacement of air by argon, it is understood that this upward displacement will only be utilized when the displacing gas is characterized by a greater density than the displaced gas. When the reverse is true, that is a heavier gas is being displaced by a lighter gas, the lighter gas is of course introduced at the top of the chamber by being disseminated either vertically down or laterally, depending on whether a full plate or partial diffuser is used, to form a uniform displacement front which is then caused to descend through the chamber.

What is claimed is:

1. Method of changing the gas contents of a chamber from one gas to another gas of different density which comprises introducing from about 1 to about 6 chamber volumes of said other gas at one vertical end of said chamber; distributing said other gas across said one vertical end of said chamber; establishing a uniform velocity, vertical, unidirectional flow of said other gas in said chamber to vertically displace said one gas; said uniform velocity being greater than the diffusion rate between said one gas and said other gas; and venting said displaced gas at the opposite vertical end of said chamber.

2. Method as claimed in claim 1 wherein said other gas is of greater density than said one gas and is introduced at the bottom of said chamber, and said displaced gas is vented at the top thereof.

3. Method as claimed in claim 1 wherein said other gas is of lesser density than said one gas and is introduced at the top of said chamber, and said displaced gas is vented at the bottom thereof.

4. Method of changing the gas content of a chamber from one gas to another gas which comprises introducing from about 1 to about 6 chamber volumes of said other gas at one vertical end of said chamber in a lateral direction to scavenge said one gas from the said one vertical end of said chamber while distributing said other gas across said chamber; establishing a uniform velocity, vertical, unidirectional flow of said other gas in said chamber to vertically displace said one gas; said uniform velocity being greater than the diffusion rate between said one gas and said other gas; and venting said displaced gas at the opposite vertical end of said chamber.

5. Method of changing the gas contents of a chamber from one gas to another gas which comprises introducing from about 1 to about 6 chamber volumes of said other gas at one vertical end of said chamber through a distributor in a lateral direction at an initial exit velocity from said distributor which causes the least mixing between said one gas and said other gas while distributing said other gas across said chamber to establish a uniform velocity, vertical, unidirectional flow of said other gas through said chamber; said uniform velocity being greater than the diffusion rate between said one gas and said other gas; and thereafter increasing the exit velocity of said other gas to minimize diffusion between said one gas and said other gas in the chamber.

6. Apparatus for changing the gas in a chamber to another gas of different density which comprises a gas inlet in one vertical end of said chamber, a gas outlet in the opposite vertical end thereof, and a porous gas distributor disposed adjacent said gas inlet and defining a second smaller chamber the only outlet from said second smaller chamber being through the pores in said porous gas distributor for laterally distributing gas delivered to said chamber across said one vertical end thereof to produce a substantially uniform displacement front of such other gas in said chamber.

7. Apparatus as claimed in claim 6 wherein said gas distributor is a porous metal member.

8. Apparatus as claimed in claim 7 wherein said member is a cup.

9. Apparatus as claimed in claim 7 wherein said member is a cone.

10. Apparatus as claimed in claim 6 wherein said distributor comprises the combination of a porous metal plate of the same horizontal area as the chamber cross-section and a plenum chamber disposed upstream of said plate.

11. Apparatus as claimed in claim 6 wherein said distributor is a perforated tubular ring.

12. A method for substantially completely displacing a gaseous atmosphere from an enclosed chamber with another gas having a density different from said gaseous atmosphere which comprises supplying said other gas to a second smaller chamber located at one vertical end of said enclosed chamber, uniformly distributing such gas from said second chamber into said enclosed chamber, causing such gas uniformly distributed from said second smaller chamber to achieve a uniform velocity vertical, unidirectional flow front in said enclosed chamber, said uniform velocity being greater than the diffusion rate between said one gas and said other gas, vertically displacing said gaseous atmosphere by uniformly advancing such uniform velocity, vertical, unidirectional flow front of such other gas and venting said vertically displaced gaseous atmosphere at the vertical opposite end of said enclosed chamber to thereby establish a new gaseous atmosphere.

13. A method for substantially completely displacing air from an enclosed chamber which comprises supplying argon to a second smaller chamber located at one vertical end of said enclosed chamber; uniformly distributing from about 1 to about 6 enclosed chamber volumes of such argon from said second chamber into said enclosed chamber; causing such argon uniformly distributed from said second smaller chamber to achieve a uniform velocity vertical, unidirectional flow front in said enclosed chamber, said uniform velocity being greater than the diffusion rate between said air and said argon; vertically displacing said air by uniformly advancing such uniform velocity, vertical, unidirectional flow front of such argon; and venting said vertically displaced air at the opposite vertical end of said enclosed chamber thereby establishing an argon atmosphere with substantially no residual air.

14. A method for substantially completely displacing air from an enclosed chamber which comprises supplying helium to a second smaller chamber located at the vertical top end of said enclosed chamber; uniformly distributing from about 1 to about 6 enclosed chamber volumes of such helium from said second chamber into said enclosed chamber; causing such helium uniformly distributed from said second smaller chamber to achieve a uniform velocity vertical, unidirectional flow front in said enclosed chamber, said uniform velocity being greater than the diffusion rate between said air and said helium; vertically displacing said air by uniformly advancing said uniform velocity, vertical, unidirectional flow front of such helium; and venting said vertically displaced air at the vertical bottom end of said enclosed chamber thereby establishing a helium atmosphere with substantially no residual air.

References Cited in the file of this patent

UNITED STATES PATENTS

| | | |
|---|---|---|
| 123,072 | Andrews | Jan. 30, 1872 |
| 2,124,764 | Comstock | July 26, 1938 |
| 2,296,380 | Davidson | Sept. 22, 1942 |
| 2,543,708 | Rice et al. | Feb. 27, 1951 |
| 2,582,462 | Schrumn | Jan. 15, 1952 |